US011006666B2

(12) United States Patent
Holtz et al.

(10) Patent No.: US 11,006,666 B2
(45) Date of Patent: May 18, 2021

(54) UNITARY HEATING ELEMENT AND HEATER ASSEMBLIES, CARTRIDGES, AND E-VAPOR DEVICES INCLUDING A UNITARY HEATING ELEMENT

(71) Applicant: Altria Client Services LLC, Richmond, VA (US)

(72) Inventors: Arie Holtz, Jerusalem (IL); Isaac Weigensberg, Tekoa (IL)

(73) Assignee: Altria Client Services LLC, Richmond, VA (US)

(*) Notice: Subject to any disclaimer, the term of this patent is extended or adjusted under 35 U.S.C. 154(b) by 180 days.

(21) Appl. No.: 15/135,930

(22) Filed: Apr. 22, 2016

(65) Prior Publication Data

US 2016/0309786 A1 Oct. 27, 2016

Related U.S. Application Data

(60) Provisional application No. 62/151,809, filed on Apr. 23, 2015.

(51) Int. Cl.
| | |
|---|---|
| *A24F 47/00* | (2020.01) |
| *H05B 3/06* | (2006.01) |
| *H05B 3/16* | (2006.01) |
| *H05B 3/14* | (2006.01) |
| *F22B 1/28* | (2006.01) |

(52) U.S. Cl.
CPC ............ *A24F 47/008* (2013.01); *F22B 1/284* (2013.01); *H05B 3/06* (2013.01); *H05B 3/141* (2013.01); *H05B 3/16* (2013.01); *H05B 2203/017* (2013.01); *H05B 2203/021* (2013.01); *H05B 2203/022* (2013.01)

(58) Field of Classification Search
CPC .. A24F 7/008; A61M 11/042; H05B 3/24–32; H05B 2203/003
USPC .................................. 219/541; 131/328, 329
See application file for complete search history.

(56) References Cited

U.S. PATENT DOCUMENTS

| | | | |
|---|---|---|---|
| 4,659,906 A | 4/1987 | Furtek | |
| 4,855,571 A * | 8/1989 | Ting ....................... | H05B 3/141 |
| | | | 219/532 |
| 5,388,594 A | 2/1995 | Counts et al. | |
| 2005/0109771 A1* | 5/2005 | Bower ................... | F16K 27/003 |
| | | | 219/635 |

(Continued)

FOREIGN PATENT DOCUMENTS

| | | |
|---|---|---|
| CN | 1122213 | 5/1996 |
| CN | 1190335 A | 8/1998 |

(Continued)

OTHER PUBLICATIONS

English (machine) Translation of EP 2574247.*

(Continued)

*Primary Examiner* — Erin E McGrath
(74) *Attorney, Agent, or Firm* — Harness, Dickey & Pierce, P.L.C.

(57) ABSTRACT

A heating element for an e-vapor device includes a planar portion including at least one filament. The filament may define an air channel through the planar portion. The heating element may include first and second lead portions extending away from the planar portion. The planar portion, the first lead portion, and the second lead portion may be a unitary body.

31 Claims, 12 Drawing Sheets

(56) References Cited

U.S. PATENT DOCUMENTS

| | | | |
|---|---|---|---|
| 2011/0155153 A1* | 6/2011 | Thorens | H05B 3/58 |
| | | | 131/329 |
| 2011/0265806 A1 | 11/2011 | Alarcon et al. | |
| 2012/0193343 A1 | 8/2012 | Johnson | |
| 2012/0260927 A1 | 10/2012 | Liu | |
| 2013/0087160 A1 | 4/2013 | Gherghe | |
| 2013/0192617 A1 | 8/2013 | Thompson | |
| 2014/0000638 A1 | 1/2014 | Sebastian et al. | |
| 2014/0014126 A1 | 1/2014 | Peleg et al. | |
| 2014/0041655 A1 | 2/2014 | Barron et al. | |
| 2014/0060524 A1 | 3/2014 | Liu | |
| 2014/0238424 A1 | 8/2014 | Macko et al. | |
| 2014/0261493 A1 | 9/2014 | Smith et al. | |
| 2014/0261500 A1 | 9/2014 | Park | |
| 2014/0270729 A1 | 9/2014 | DePiano et al. | |
| 2014/0305454 A1 | 10/2014 | Rinker et al. | |
| 2014/0314397 A1 | 10/2014 | Alima | |
| 2014/0334802 A1 | 11/2014 | Dubief | |
| 2015/0027456 A1 | 1/2015 | Janardhan et al. | |
| 2015/0117842 A1 | 4/2015 | Brammer et al. | |
| 2015/0272218 A1 | 10/2015 | Chen | |
| 2016/0007655 A1 | 1/2016 | Li et al. | |
| 2017/0035109 A1 | 2/2017 | Liu | |
| 2018/0125120 A1 | 5/2018 | Gavrielov et al. | |

FOREIGN PATENT DOCUMENTS

| | | |
|---|---|---|
| CN | 1316205 A | 10/2001 |
| CN | 1887029 A | 12/2006 |
| CN | 104010529 A | 8/2014 |
| CN | 203986096 U | 12/2014 |
| CN | 104287098 A | 1/2015 |
| CN | 104770893 B | 11/2017 |
| EP | 2574247 A1 | 4/2013 |
| JP | 4383843 B2 | 12/2009 |
| WO | WO-2014/079024 A1 | 5/2014 |
| WO | WO-2015/117704 A1 | 8/2015 |
| WO | WO-2015/149405 A1 | 10/2015 |
| WO | WO-2016172448 A1 | 10/2016 |

OTHER PUBLICATIONS

International Search Report for International Application No. PCT/US2016/028793 dated Jul. 1, 2016.

International Search Report for International Application No. PCT/US2016/028800 dated Jul. 1, 2016.

International Preliminary Report on Patentability and Written Opinion for corresponding International Application No. PCT/US2016/028793 dated Nov. 2, 2017.

Non-Final Office Action for corresponding U.S. Appl. No. 15/135,923 dated Jun. 14, 2018.

U.S. Appl. No. 15/135,923, filed Apr. 22, 2016.

Eurasian Decision as to Patentability of the Invention for Application No. 201792105, dated Jul. 15, 2019, English translation thereof.

United States Office Action for U.S. Appl. No. 15/135,923, dated Aug. 8, 2019.

Eurasian Invention Patentability Opinion for corresponding Application No. 201792338, dated Jun. 11, 2019, English translation thereof.

United States Notice of Allowance for U.S. Appl. No. 15/135,923, dated Feb. 13, 2020.

Chinese Office Action for corresponding Application No. 201680023539.6, dated Sep. 24, 2019, English translation thereof.

Chinese Office Action for corresponding Application No. 201680023540.9, dated Dec. 18, 2019, English translation thereof.

European Examination Report for corresponding Application No. 16719715.1-1204, dated Oct. 18, 2019.

Chinese Office Action for corresponding Application No. 201680023539.6. dated Jun. 28, 2020.

International Search Report and Written Opinion for corresponding Application No. PCT/US2020013848, dated Apr. 22, 2020.

European Office Action for corresponding Application No. 16719716.9-1202, dated Apr. 15, 2020.

Israeli Office Action for corresponding Application No. 255131, dated Jul. 15, 2020.

United States Notice of Allowance for Application No. 15/135,923, dated Aug. 25, 2020.

Eurasian Office Action issued Sep. 15, 2020 in Eurasian Application No. 201792105.

Ukrainian Office Action dated Nov. 18, 202 for corresponding Ukrainian Application No. a201711417, and English-language translation thereof.

Non-Final Office Action dated Oct. 13, 2020 in U.S. Appl. No. 16/273,612.

Chinese Office Action dated Feb. 4, 2021 for corresponding Chinese Application No. 201680023539.6, and English-language translation thereof.

Ukrainian Office Action dated Feb. 25, 2021 for corresponding Ukrainian Application No. a202007266, and English-language summary thereof.

U.S. Office Action dated Mar. 23, 2021 for corresponding U.S. Appl. No. 16/273,612.

* cited by examiner

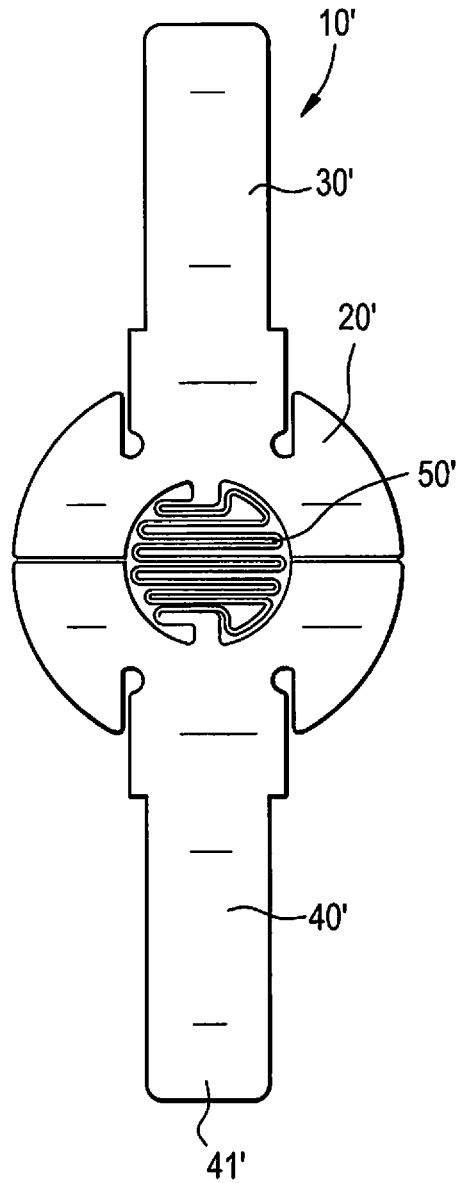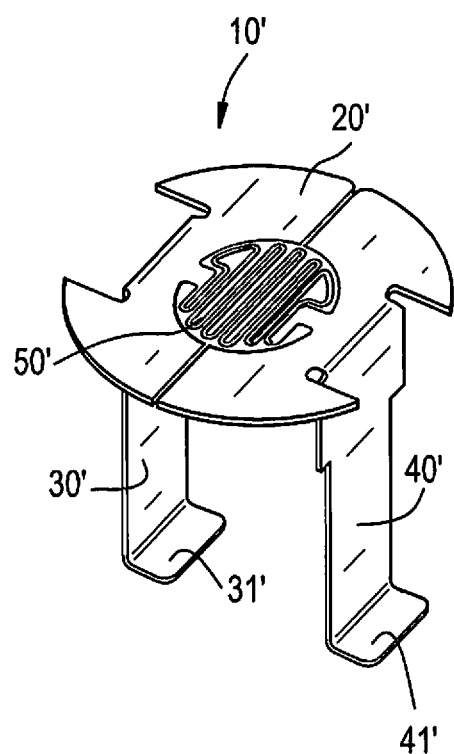
FIG. 2A
FIG. 2B

UNITARY HEATING ELEMENT AND HEATER ASSEMBLIES, CARTRIDGES, AND E-VAPOR DEVICES INCLUDING A UNITARY HEATING ELEMENT

CROSS REFERENCE TO RELATED APPLICATIONS

This application claims priority to U.S. provisional application No. 62/151,809 filed on Apr. 23, 2015, the entire contents of which are hereby incorporated by reference.

BACKGROUND

1. Field

At least some example embodiments relate generally to an electronic vaping (e-vaping or e-vapor) device.

2. Related Art

Electronic vaping devices are used to vaporize a pre-vapor formulation into a vapor. These electronic vaping devices may be referred to as e-vaping devices. E-vaping devices include a heater, which vaporizes the pre-vapor formulation to produce the vapor. The e-vaping device may include several e-vaping elements including a power source, a cartridge or e-vaping tank including the heater and a reservoir capable of holding the pre-vapor formulation.

SUMMARY

At least one example embodiment provides a heating element for an e-vapor device includes a planar portion including at least one filament. The filament may define an air channel through the planar portion. The heating element may include first and second lead portions extending away from the planar portion. The planar portion, the first lead portion, and the second lead portion may be a unitary body.

According to at least one example embodiment, the filament defines the air channel through a central area of the planar portion.

According to at least one example embodiment, the filament includes stainless steel.

According to at least one example embodiment, the first and second lead portions extend away from the planar portion in a direction that is substantially perpendicular to the planar portion.

According to at least one example embodiment, a tip of the first lead portion and a tip of the second lead portion are bent in a direction that is parallel to the planar portion.

According to at least one example embodiment, the filament follows a circuitous path and defines the air channel.

According to at least one example embodiment, a width of the filament varies along the circuitous path.

According to at least one example embodiment, the width of the filament gradually increases in a direction away from the air channel.

According to at least one example embodiment, the filament includes a plurality of filament portions that are substantially u-shaped, and the plurality filament portions are connected to one another at end sections of each u-shape.

According to at least one example embodiment, a space between adjacent ones of the plurality of filament portions gradually increases in a direction away from the air channel.

At least one example embodiment provides a cartridge for an e-vapor device. The cartridge includes a housing including a reservoir portion and a connector portion, the connector portion being configured to connect the cartridge to a power supply section. The cartridge includes a heater assembly including a heating element disposed in the housing. The heating element includes a planar portion in fluid communication with the reservoir portion. The heating element includes first and second lead portions extending away from the planar portion.

According to at least one example embodiment, the planar portion, the first lead portion, and the second lead portion are a unitary body.

According to at least one example embodiment, the planar portion includes at least one filament, the filament defining an air channel through the planar portion.

According to at least one example embodiment, reservoir portion includes a porous substrate, and an inner tube defining an airway through a central area of the reservoir portion and defining a cavity between the housing and the inner tube. The cavity is configured to store a pre-vapor formulation and the porous substrate is in fluid communication with the cavity.

According to at least one example embodiment, the porous substrate includes an opening aligned with the air channel, and the porous substrate contacts the planar portion of the heating element.

According to at least one example embodiment, the reservoir portion includes a gasket configured to provide the fluid communication between the porous substrate and the storage portion.

According to at least one example embodiment, the gasket includes an opening that fits around the inner tube, and the gasket is configured to provide the fluid communication via at least one aperture in the gasket.

According to at least one example embodiment, the at least one aperture is four apertures in a diamond configuration around the opening.

According to at least one example embodiment, the heater assembly includes a support disposed in the housing and supporting the heating element.

According to at least one example embodiment, the support has an end surface including a through hole extending through a central area of the support, a first slot, and a second slot. The first slot and the second slot are disposed on the end surface at opposing sides of the through hole. The first lead portion extends through first slot, and the second lead portion extends through the second slot.

According to at least one example embodiment, the first lead portion and the second lead portion are bent in a direction that is substantially parallel to the planar portion.

According to at least one example embodiment, the support includes a hollow conductive rivet extending through the through hole such that the conductive rivet is electrically connected to the second lead portion and electrically isolated from the first lead portion.

According to at least one example embodiment, wherein the support has a male thread to engage with a female thread of the housing.

According to at least one example embodiment, the support includes at least two recesses disposed on opposite sides of a lateral surface of the support, the reservoir portion includes at least two connection points, and the connector portion includes at least two flexible tabs extending into the at least two recesses and releasably engaged with the at least two connection points.

According to at least one example embodiment, the connector portion includes a conductive inner wall, and the first lead portion is electrically connected to the inner wall of the connector portion.

At least one example embodiment provides a heater assembly for an e-vapor device. The heater assembly may include a heating element. The heating element may include a planar portion including at least one filament, the filament defining an air channel through the planar portion. The heating element may include first and second lead portions extending away from the planar portion. The heater assembly may include a support supporting the heating element, the support including a first slot and a second slot. The first lead portion may extend through the first slot, and the second lead portion may extend through the second slot.

According to at least one example embodiment, the support is substantially cylindrical and has an end surface including a through hole a first slot, and a second slot, the through hole extending through a central area of the support. The first slot and the second slot are disposed on the end surface at opposing sides of the through hole. The first lead portion extends through first slot, and the second lead portion extends through the second slot.

According to at least one example embodiment, the support has a male thread around circumference lateral surface of the support and at least two rectangular shaped recesses disposed in the male thread on opposing sides of the lateral surface of the support. The at least two recesses accommodate at least two tabs of a connection portion of the e-vapor device.

According to at least one example embodiment, the first lead portion and the second lead portion are bent in a direction that is substantially parallel to the planar portion.

According to at least one example embodiment, the support includes a hollow conductive rivet extending through the through hole such that the conductive rivet is electrically connected to the second lead portion and electrically isolated from the first lead portion.

According to at least one example embodiment, the through hole is aligned with the air channel.

At least one example embodiment provides a cartridge including a housing including a reservoir portion, and a heater assembly disposed in the housing. The heater assembly may include a heating element. The heating element may include a planar portion in fluid communication with the reservoir portion, and first and second lead portions extending away from the planar portion. The e-vapor device may include a power supply section configured to selectively supply power to the heating element.

According to at least one example embodiment, the cartridge and the power supply section are releasably connected.

According to at least one example embodiment, the cartridge and the power supply section are in a unitary housing.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

FIGS. 2A and 2B illustrate a heating element according to at least one example embodiment.

DETAILED DESCRIPTION OF EXAMPLE EMBODIMENTS

Figure 1A:
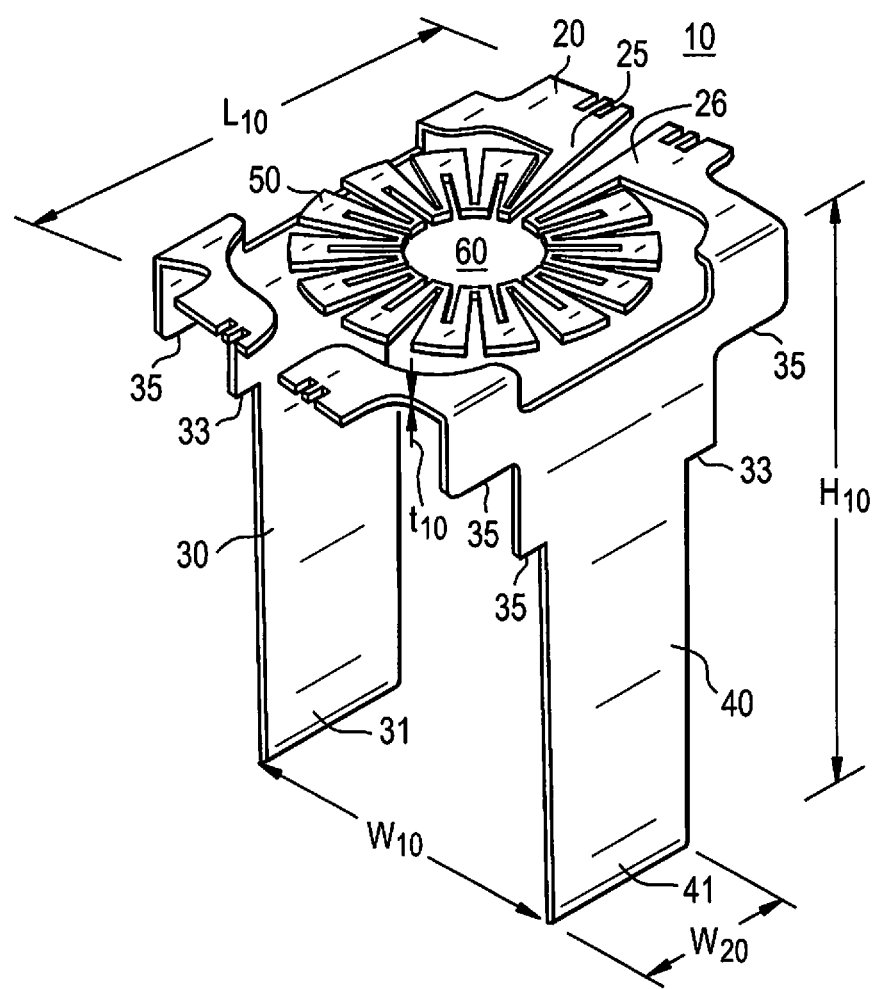
FIGS. 1A-1C are perspective views of a heating element and portions of the heating element according to at least one example embodiment.

Some detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, regions, layers and/or sections, these elements, regions, layers, and/or sections should not be limited by these terms. These terms are only used to distinguish one element, region, layer, or section from another region, layer, or section. Thus, a first element, region, layer, or section discussed below could be termed a second element, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, and/or elements, but do not preclude the presence or addition of one or more other features, integers, steps, operations, elements, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

Figure 1B:
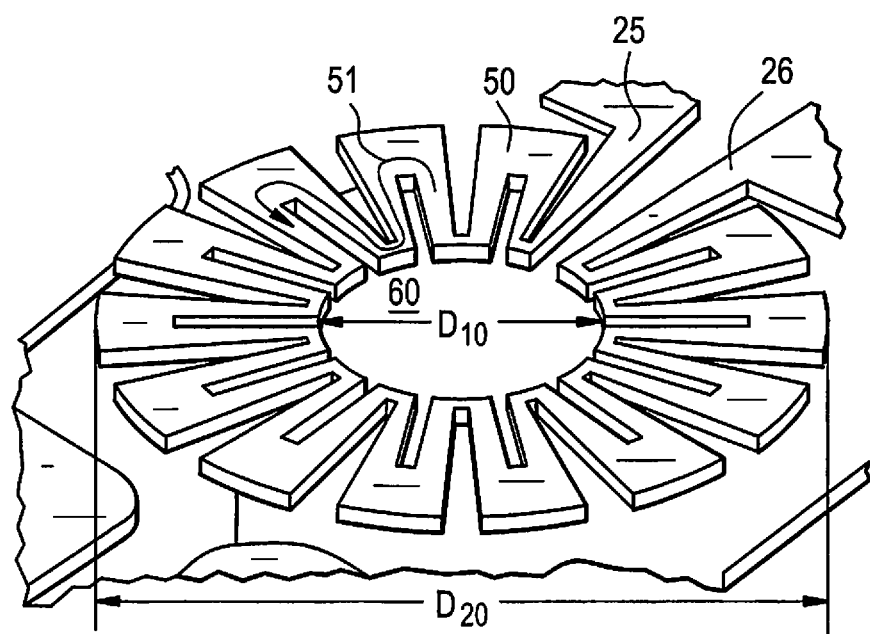
Figure 1C:
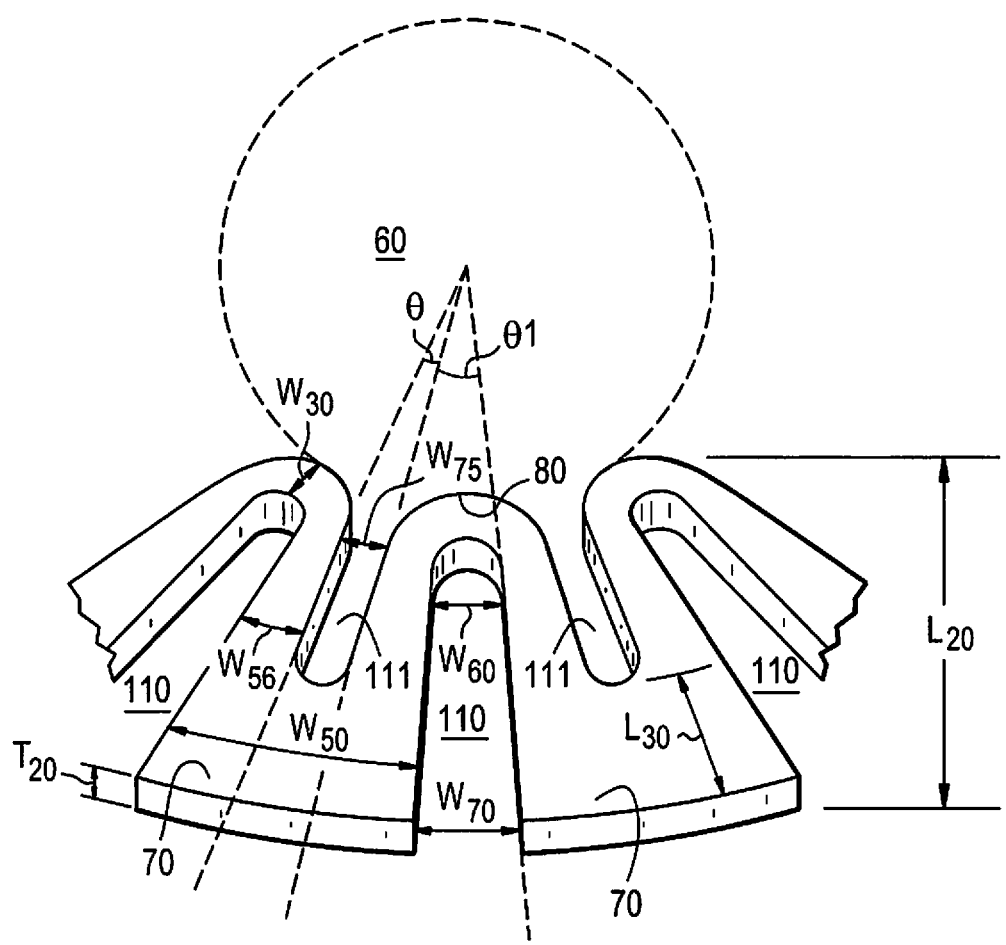

FIGS. 1A-1C are perspective views of a heating element and portions of the heating element according to at least one example embodiment.

FIG. 1A illustrates a heating element 10 for an e-vapor device. The heating element 10 includes a planar portion 20 having at least one filament 50. The filament 50 may define an air channel 60 through the planar portion 20. For example, the filament 50 defines the air channel 60 through a central area of the planar portion 20 (e.g., such that air flowing through the central area is unobstructed). The air channel 60 may have a substantially circular shape.

The planar portion 20 (with the filament 50) may have a substantially flat or planar structure. Alternatively, a portion of the filament 50 may be punched in or punched out so as to change the flat structure into a three-dimensional structure. This may allow for the heating element 10 to heat additional surface area of a porous substrate of an e-vapor device. The structure of the filament 50 is described in further detail below with reference to FIGS. 1B and 1C.

The heating element 10 may include stainless steel or alloy thereof. Stainless steel (e.g., stainless steel 304) has a relatively high temperature coefficient, which allows for accurate temperature control of the filament 50. Alternatively, the heating element 10 may include Nichrome (e.g., 80% nickel, 20% chromium) or other materials. Examples of other suitable electrically resistive materials for the heating element 10 include titanium, zirconium, tantalum, and metals from the platinum group. Examples of suitable metal alloys include stainless steel, nickel-, cobalt-, chromium-, aluminum-, titanium-, zirconium-, hafnium-, niobium-, molybdenum-, tantalum-, tungsten-, tin-, gallium-, manganese-, and iron-containing alloys, and super-alloys based on nickel, iron, cobalt, and stainless steel. For instance, the heating element 10 may include nickel aluminides, a material with a layer of alumina on the surface, iron aluminides, and other composite materials. The electrically resistive material may optionally be embedded in, encapsulated, or coated with an insulating material or vice-versa, depending on the kinetics of energy transfer and the external physicochemical properties required. In a non-limiting example embodiment, the heating element 10 may comprise at least one material selected from the group consisting of stainless steel, copper, copper alloys, nickel-chromium alloys, super-alloys, and combinations thereof. In another non-limiting example embodiment, the heating element 10 includes iron-chromium alloys. A higher resistivity for the heating element 10 lowers the current draw or load on the power supply or battery of an e-vapor device.

Still referring to FIG. 1A, the heating element 10 may include a first lead portion 30 and a second lead portion 40 extending away from the planar portion 20. For example, the first lead portion 30 and the second lead portion 40 extend away from the planar portion 20 in a direction that is substantially perpendicular to the planar portion 20. As shown in FIG. 1A, the planar portion 20, the first lead portion 30, and the second lead portion 40 are a unitary body, which allows for efficient manufacturing of the heating element 10. For example, the heating element 10 may be initially formed as a substantially flat element before first and second lead portions 30 and 40 are bent as shown in FIG. 1A. Accordingly, the heating element 10 may be referred to as a single piece heating element. A tip 31 of the first lead portion 30 and a tip 41 of the second lead portion 40 may be bent or bendable in a direction that is parallel to the planar portion 20 (this bending is explicitly shown in FIGS. 2B and 5B, for example).

A height H10 of the heating element 10 may be between 6.0 mm and 10 mm, for example, 8.5 mm. A width W10 of the heating element 10 may be between 4.5 mm and 5 mm, for example, 4.72 mm. A width W20 of the first lead portion 30 and the second lead portion 40 may be between 1.0 mm and 3.0 mm, for example, 1.9 mm. A length L10 of the heating element 10 may be between 4.7 mm and 7.8 mm, for example, 7.4 mm. A thickness T10 of the planar portion 20 may be between 0.05 mm and 0.30 mm, for example, 0.10 mm. The thickness T10 may be uniform throughout the planar portion 20, the first lead portion 30, and the second lead portion 40. However, example embodiments are not limited thereto. For example, the thickness of the planar portion 20 may be less than a thickness of the first lead portion 30 and the second lead portion 40.

The first lead portion 30 and the second lead portion 40 may be substantially rectangular shaped and have step portions 33 and 35 at ends closest to the planar portion 20. Step portions 35 may rest on a surface of a support for the heating element 10 while step portions 33 may provide a force that allows for the heating element 10 to be push fit into the support (see support 350 in FIGS. 5A and 5B, for example). Although two step portions 33 and 35 are shown, the first and second lead portions 30 and 40 may have one step portion or additional step portions as desired.

As illustrated in further detail by FIG. 1B, the filament 50 may follow a circuitous or sinuous path 51 to define the air channel 60. For example, the filament 50 may follow the circuitous path 51 such that the air channel 60 is substantially circular and has a diameter d10 between 1.2 mm and 2.0 mm, for example, 1.6 mm. The filament 50 may have a diameter d20 between 3.0 mm and 7.0 mm, for example, 4.1 mm. The filament 50 may be spaced apart from other sections of the planar portion 20 except at connection points 25 and 26. As a result, the electrical connection between the first lead portion 30 and the second lead portion 40 is through the filament 50 (i.e., during operation, current must travel between lead portions 30 and 40 through filament 50 and parts of the planar portion 20 connected to the connection points 25 and 26).

As illustrated in further detail by FIG. 1C, the filament 50 includes a plurality of filament portions 70 that are substantially u-shaped. The plurality filament portions 70 change from one to the other at end sections 80 of each u-shape. As further illustrated by FIG. 1C, a width of the filament 50 may vary along the circuitous path 51. For example, as indicated by increasing widths W30, W40, and W50, the width of the filament 50 gradually increases in a direction away from the air channel 60. A width W30 may be between 0.05 mm and 0.30 mm, for example. A width W40 may be between 0.05 mm and 1.0 mm, for example 0.16 mm. A width W50 may be between 0.25 mm and 1.00 mm, for example, 0.65 mm. A length L20 of each filament portion 70 may be between 0.5 mm and 3.5 mm, for example, 2.5 mm. It should be understood that a number of filament portions 70 may vary as desired. For example, the number of filament portions 70 may be between 3 and 25.

Spaces 110 between adjacent ones of the plurality of filament portions 70 may gradually increase in a direction away from the air channel 60. For example, a width W60 of the space 110 closest to the air channel 60 may less than a width W70 of the space 110 furthest from the air channel 60. In at least one example embodiment, a width W60 and a width W70 may be set so that a widest section of the spaces 110 at width W70 occupies between 2° and 90°, for example, 8.3° of a 360° circle around the filament 50 (shown in FIG. 1C by angle θ). The same dimensions may be set for widths W75 and W80 of spaces 111 between u-shaped portions of each filament portion 70. However, example embodiments are not limited thereto, and the spaces 110 and the spaces 111 may have different dimensions as desired. A length L30 between an end of space 111 that is furthest from the air channel 60 and a part of the u-shaped portion furthest away from the air channel 60 may be between 0.1 mm and 0.7 mm, for example, 0.3 mm.

A thickness T20 of the filament portions 70 may be between 0.05 mm and 0.30 mm, for example, 0.10 mm.

Due to the above described structure, the filament 50 may generate a gradient of heat that is most intense near the air channel 60 and gradually dissipates in a direction away from the air channel 60. It should be understood that an electrochemical etching process may be used to manufacture heating element 10 with the above described dimensions. Alternatively, the heating element 10 may be formed using a stamping process. It should also be understood that some parts of or the entire heating element 10 may be scaled up or down (e.g., scaled up 2.5 times larger than described above) depending on the desired implementation an e-vapor device.

FIGS. 2A and 2B illustrate a heating element according to at least one example embodiment. For example, FIG. 2A is a top-view of a heating element 10' before bending and FIG. 2B is a perspective view of the heating element 10' after bending.

As illustrated in FIGS. 2A and 2B, heating element 10' is similar to the heating element 10 in FIGS. 1A-1C, and includes a planar portion 20', a first lead portion 30', a second lead portion 40'. However, heating element 10' does not include an air channel 60 through the filament 50'. The transition from FIG. 2A to FIG. 2B shows how the heating element 10' in FIG. 2A is bent along the dotted lines to form the heating element 10' in FIG. 2B with bent first and second lead portions 30' and 40' and bent tips 31' and 41'. It should be appreciated that tips 31 and 41 in FIG. 1 may be bent in the same manner as shown by tips 31' and 41' in FIG. 2B.

Figure 3A:
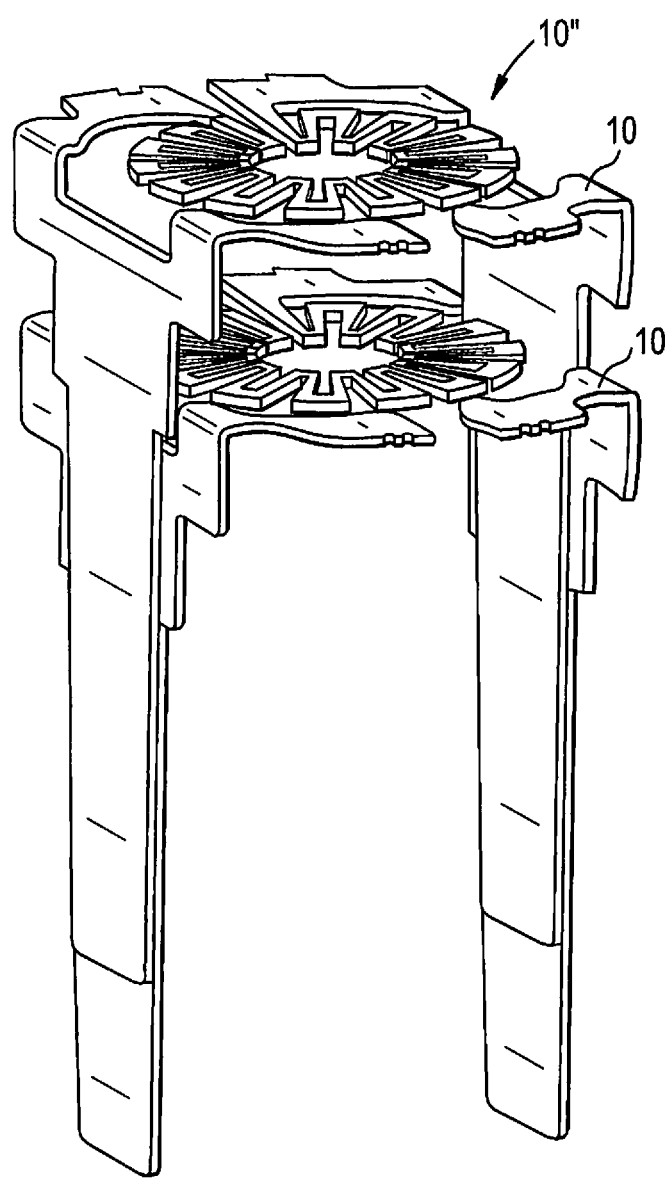
FIGS. 3A and 3B are perspective views of heating elements according to at least one example embodiment.
Figure 3B:
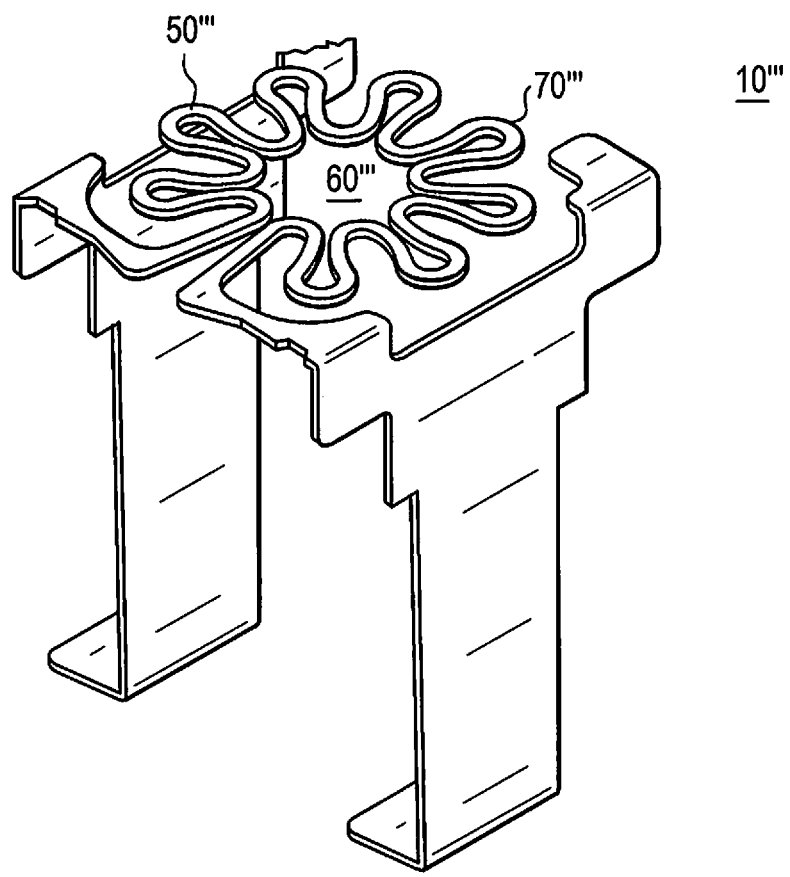

FIGS. 3A and 3B are perspective views of heating elements according to at least one example embodiment.

FIG. 3A is a perspective view of a dual heating element according to at least one example embodiment. The dual heating element 10" may include two or more heating elements (e.g., two heating elements 10 from FIG. 1) stacked on top of one another. The heating elements 10 may be electrically connected to one another via welding, soldering, or a pressure-based connection. If a porous substrate in fluid communication with a pre-vapor formulation is placed between the two heating elements 10, the dual heating element 10" may uniformly heat both sides of the porous substrate to create a high efficiency vapor production. A pre-vapor formulation is a material or combination of materials that may be transformed into a vapor. For example, the pre-vapor formulation may be a liquid, solid, and/or gel formulation including, but not limited to, water, beads, solvents, active ingredients, ethanol, plant extracts, natural or artificial flavors, and/or vapor formers such as glycerine and propylene glycol.

Although FIG. 3A shows that the dual heating element 10" may be formed from two heating or more elements 10, it should be understood that the dual heating element 10" may include two or more heating elements 10' from FIGS. 2A and 2B, or one or more heating elements 10 and one or more heating elements 10' stacked in a desired configuration.

FIG. 3B is a perspective view of a heating element according to at least one example embodiment. FIG. 3B illustrates a heating element 10''' with a filament 50''' that defines an opening 60'''. The heating element 10''' may have substantially the same dimensions as the heating element 10 from FIGS. 1A-1C except that the filament 50''' has filament portions 70''' that have a substantially same width and substantially rounded ends throughout the circuitous or sinuous path.

Figure 4A:
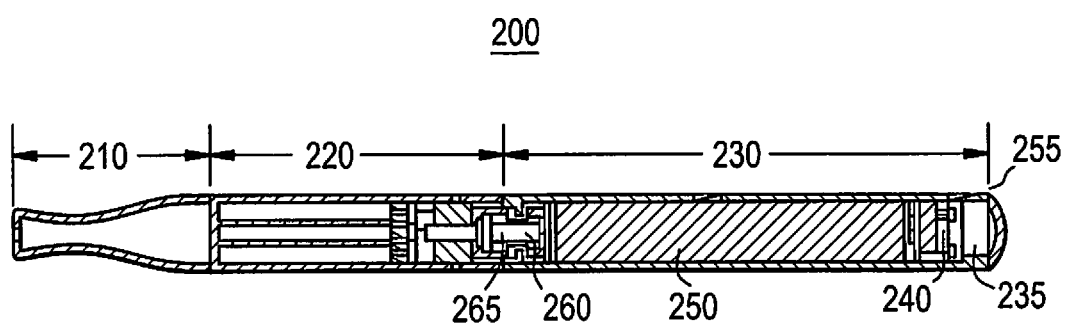
FIGS. 4A and 4B are cross-sectional views of an e-vapor device including a heating element according to an example embodiment.
Figure 4B:
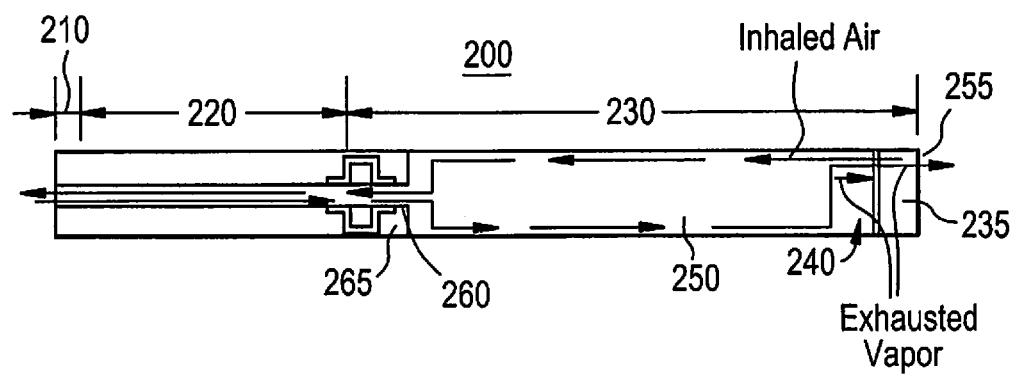

FIGS. 4A and 4B are cross-sectional views of an e-vapor device including a heating element according to an example embodiment.

FIGS. 4A and 4B illustrate sections of an e-vapor device 200. For example, the e-vapor device 200 may have a mouthpiece section 210, a cartridge 220, and a power supply section 230. The mouthpiece section 210 may fit (e.g., pressure fit, or thread fit) onto the cartridge 220 in order to allow for an adult vaper to apply a negative pressure to the mouthpiece section 210 and draw vapor from e-vapor device. It should be understood that the mouthpiece 210 may be excluded from the configuration shown in FIGS. 4A and 4B or integrated with the cartridge 220 to reduce the number of parts. The cartridge 220 may include a heating element (e.g., one of the heating elements of FIGS. 1A-3). The cartridge 220 may be replaceable. The cartridge 220 is described in more detail below with reference to FIGS. 5A-5H, and 6. The cartridge 220 and the power supply section 230 may be releasably connected (e.g., by a threading engagement). Alternatively, the cartridge 220 and the power supply section 230 may be in a unitary housing.

The power supply section 230 may be configured to selectively supply power to the heating element in the cartridge 220 via a battery 250. The power supply section 230 may include an indicator 235, control electronics 240, battery 250, air inlet 255, conductive post 260, and a connector 265. The indicator 235 may be, for example, a light emitting diode (LED) located at one end of the power supply section 230. The LED may flash different colors and/or different patterns to indicate different information about the e-vapor device 200. For example, the LED may flash one color to indicate activation of the e-vapor device 200 and another color to indicate a battery level of the battery 250. However, example embodiments are not limited thereto, and the LED may be used to indicate other information through various colors and patterns of flashes.

Figure 5A:
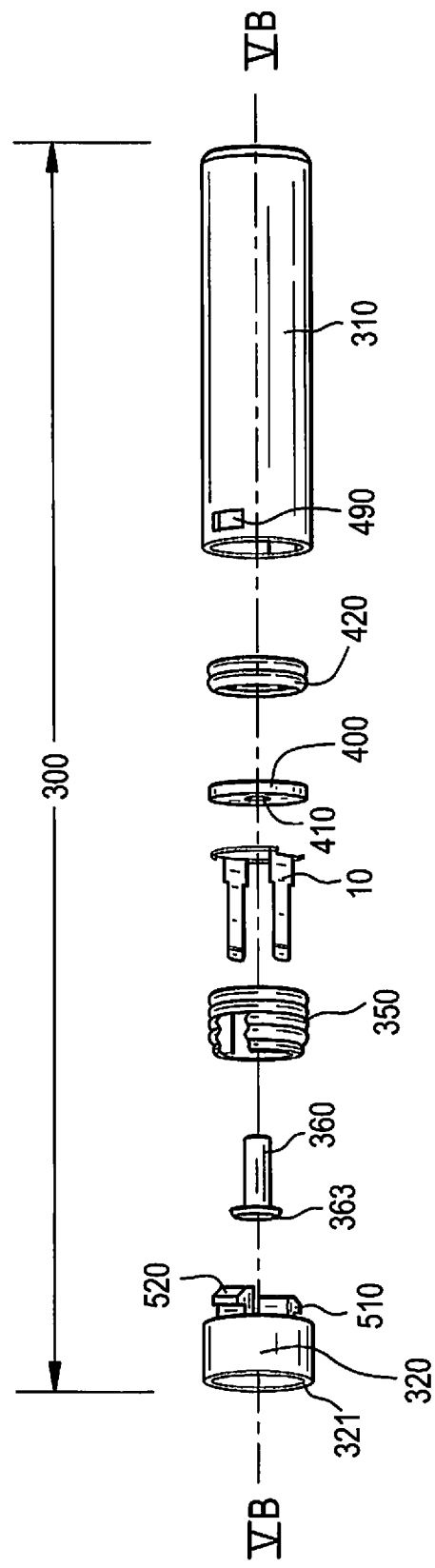
FIGS. 5A-5H illustrate elements of a cartridge of the e-vapor device in FIG. 4.
Figure 5B:
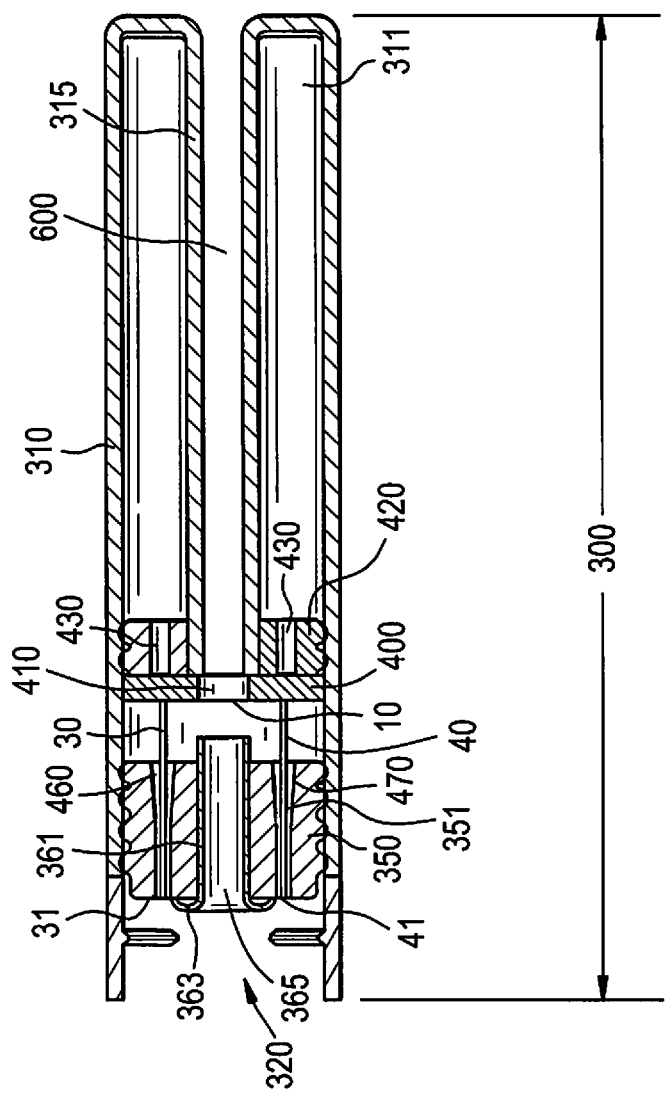

The battery 250 may selectively supply power to the indicator 235, the control electronics 240, and the heating element 10 (see FIGS. 5A and 5B). For example, the battery 250 may selectively supply power under a control of the control electronics 240. The control electronics 240 may include control circuitry including a puff sensor for sensing a negative pressure applied by an adult vaper. The puff sensor is operable to sense an air pressure drop in the e-vapor device 200, which causes the control electronics 240 to initiate the application of voltage from the battery 250 to the heating element 10. For example, if the puff sensor indicates that an adult vaper is applying a negative pressure to the e-vapor device 200, the control electronics 240 initiates a puff cycle by connecting the battery 250 to the heating element 10 to heat the heating element 10, thereby vaporizing a pre-vapor formulation in a porous substrate in contact with the heating element 10. Upon termination applying negative pressure by an adult vaper, the puff sensor ceases to sense the air pressure drop and the control electronics 240 disconnects the battery 250 from the heating element 10 to end the puff cycle.

The control electronics 240 may be between the indicator 235 and the battery 250 within the power supply section 230. The connector 265 may facilitate a threaded connection to the cartridge 220. For example, the threaded connection may be a combination of a conductive male threaded member on the connector 265 and a conductive or non-conductive female threaded receiver on the cartridge 220 (or vice versa). Alternatively, the threaded connection may be in a form of other suitable structures, such as a snug-fit, detent, clamp, and/or clasp arrangement. Although not explicitly shown, one terminal of the battery 250 is electrically connected to the conductive post 260 and the other terminal of the battery 250 is electrically connected to the connector 265 via the control electronics 240.

The power supply section 230 may include an air inlet/outlet 255 at an end of the power supply section 230 nearest to the control electronics 240. As shown by the arrows in FIG. 4B, when air is drawn through the mouthpiece 210, air enters the tip of the e-vapor device 200 at air inlet/outlet 255, travels past the control electronics 240 that includes the puff sensor through the spaces provided around the puff sensor (thereby detecting a negative pressure and activating the heating element 10), and continues past the battery 250. The air then goes through an opening in the axis of a conductive post 260 of the battery's 250 male connector, and straight into a conductive rivet engaged with the female connector of the cartridge 220 (see element 360 in FIGS. 5A and 5B). The air is then inundated with particles of vapor (produced by the heating of a porous substrate containing a pre-vapor formulation as a result of the activated heating element 10) and exits through the mouthpiece section 210. As shown by the return arrows in FIG. 4B, excess vapor travels through the e-vapor device 200 and may be exhausted from the air inlet/outlet 255.

Although FIGS. 4A and 4B shows one air inlet/outlet 255, the e-vapor device 200 may include additional air inlets/outlets at other locations on the e-vapor device, for example, at or closer to a connection between the cartridge 220 and the power supply section 230. This may allow for air intake at other locations of the e-vapor device 200.

The battery 250 may be a Lithium-ion battery or one of its variants (e.g., a Lithium-ion polymer battery). The battery 250 may also be a Nickel-metal hydride battery, a Nickel cadmium battery, a Lithium-manganese battery, a Lithium-cobalt battery, or a fuel cell.

FIGS. 5A-5H illustrate elements of a cartridge of the e-vapor device in FIG. 4.

For example, FIG. 5A is an exploded view of a cartridge of the e-vapor device shown in FIG. 4. FIG. 5B is a cross-sectional view of the cartridge in FIG. 5A taken along line VB-VB'. FIGS. 5C-5H illustrate the details of various parts of the cartridge shown in FIGS. 5A and 5B.

Figure 5C:
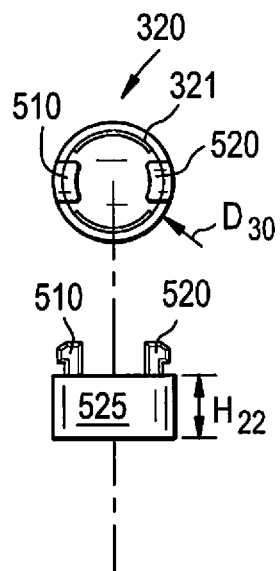

FIGS. 5A and 5B illustrate that the cartridge 220 includes a housing 300. The housing 300 may include a reservoir portion 310 and a connector portion 320. The connector portion 320 is configured to connect the cartridge 220 to a power supply section (e.g., the power supply section 230 in FIG. 4). With reference to FIGS. 5A, 5B, and 5C, the connector portion 320 may be substantially hollow and have a substantially cylindrical shape. The connector portion 320 may include a female thread 321 for releasably engaging with a male thread of the connector 265 of power supply section 230 in FIG. 4. The connector portion 320 may be made of, for example, a synthetic polymer or other material suitable for e-vapor devices such as solid plastic, and/or metal (e.g., stainless steel). An inner wall of the connector portion 320 may be conductive or non-conductive. The connector portion 320 may include substantially rectangular tabs (e.g., flexible tabs) 510 and 520 on opposing edges of the connector portion 320. The tabs 510 and 520 provide a releasable snap fit connection to connection points 490 of the reservoir portion 310 (see FIG. 6). A body 525 of the connector portion 320 may have a height H20 of between 3.0 mm and 10.0 mm, for example, 4.70 mm. A diameter D30 of the connector portion 320 may be between 8.5 mm and 9.5 mm, for example, 9.0 mm. The diameter D30 may be larger or smaller depending on the application. For example, diameter D30 may be the same as the diameter D35 of the reservoir portion 310. Alternatively, the connector portion 320 and the power supply section 230 may be fixed together (i.e., not releasable).

Figure 5D:
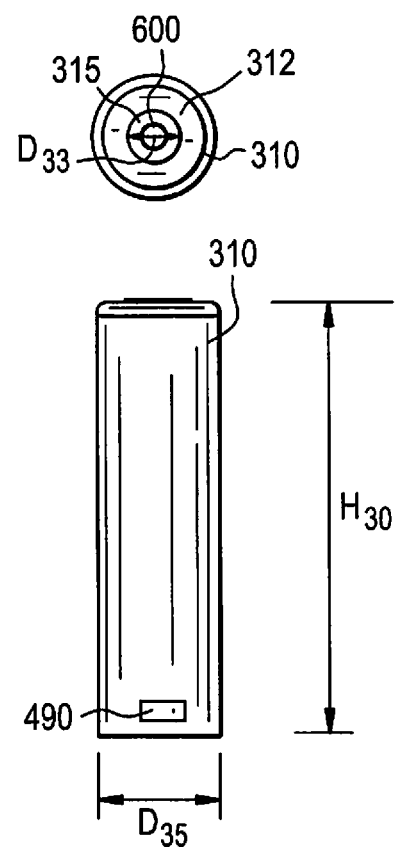

With reference to FIGS. 5A, 5B, and 5D, the reservoir portion 310 is a storage portion configured to store a pre-vapor formulation in a cavity 311 of the reservoir portion 310. Although not shown, the cavity 311 may include a pre-vapor formulation containing material (e.g., a material to draw the pre-vapor formulation via capillary action). The reservoir portion 310 may have a substantially cylindrical shape and be made of, for example, a synthetic polymer or other material suitable for e-vapor devices such as, glass, ceramic, and/or metal (e.g., stainless steel). The reservoir portion 310 may have a closed end, an open end, and a cylindrically shaped inner tube 315 may define an airway 600 that passes through a central area of the reservoir portion 310 from the closed end to the open end. The airway 600 may have a diameter of between 1.0 mm and 4.0 mm, for example, 1.60 mm. The reservoir portion 310 may have a height H30 of between 15 mm and 60 mm, for example, 32.9 mm. The reservoir portion 310 may have a diameter D35 of between 6.5 mm and 25 mm, for example, 9.0 mm. That is, the reservoir portion 310 and the connector portion 320 may have a same diameter. The reservoir portion 310 includes at least two connection points 490 (due to the symmetry of reservoir portion 310, only one connection point 490 is shown in FIGS. 5A and 5D). Tabs 510 and 520 of the connector portion 320 may be releasably engaged with the at least two connection points 490 (see FIG. 6).

Figure 5E:
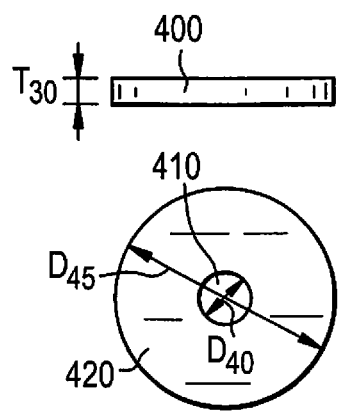

With reference to FIGS. 5A, 5B, and 5E, the reservoir portion 310 includes a porous substrate 400 in fluid communication with the cavity 311. The porous substrate 400 may be substantially disc shaped and have a diameter of between 5.0 mm and 24 mm, for example, 8.0 mm. The porous substrate may have a thickness T30 between 0.5 mm and 2.0 mm, for example, 1.0 mm. The porous substrate 400 may have a capacity to draw a pre-vapor formulation via capillary action as a result of the interstitial spacing between filaments of the porous substrate 400. For example, the porous substrate 400 may be a ceramic material or other porous material capable of withstanding varying temperatures of the heating element 10 such as a ceramic, mineral fibrous material, metal (in a honeycomb or mesh structure), and glass fibers. A central area of the porous substrate 400 includes an opening 410 with a diameter D40 between 1.0 mm and 4.0 mm, for example, 2.0 mm. The opening 410 may be aligned with the air channel 60 of the heating element 10 and with the airway 600 of the reservoir portion 310.

Figure 5F:
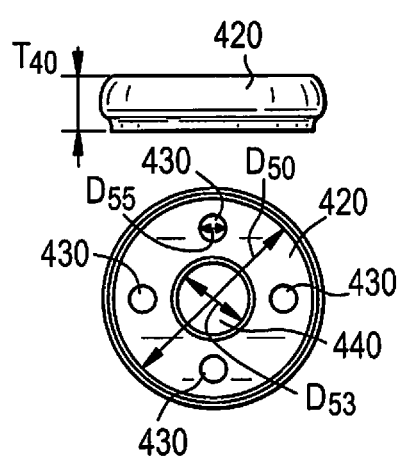

With reference to FIGS. 5A, 5B, and 5F, the reservoir portion 310 includes a gasket 420 configured to provide the fluid communication between the porous substrate 400 and the cavity 311. The gasket 420 may include rubber or silicon, or some other material capable of preventing pre-vapor formulation in the cavity 311 from passing between the gasket 420 and walls of the reservoir portion 310 such as organic elastomers and/or inorganic elastomers. The gasket 420 may have a thickness T40 between 1.0 mm and 3.0 mm, for example, 2.0 mm. The gasket 420 may have a diameter D50 between 7.7 mm and 8.5 mm, for example, 8.1 mm. It should be understood that the diameter D50 may vary from these values so long as the gasket 420 provides an effective seal in the reservoir 310. A central area of the gasket 420 includes an opening 440 with a diameter D53 between 2.6 mm and 2.8 mm, for example, 2.7 mm so that the gasket 420 fits around the airway 600. The gasket 420 is configured to provide the fluid communication between the porous substrate 400 and the cavity 311 via at least one aperture 430 disposed adjacent to the opening 440. According to at least one example embodiment, the gasket 420 includes two or more apertures 430 (e.g., four apertures) disposed in a diamond configuration on opposing sides of the opening 440. The apertures 430 may be substantially circular in shape and have a diameter D55 between 0.8 mm and 1.2 mm, for example, 1.0 mm. However, example embodiments are not limited to the shape and size of the apertures shown in FIG. 5F and it should be understood that the apertures 430 may be of various sizes and shapes so long as the porous substrate 400 does not become oversaturated with pre-vapor formulation and leak from the e-vapor device 200.

FIGS. 5A and 5B further illustrate that the cartridge 220 includes a heater assembly 330. The heater assembly 330 includes a heating element 10, a support 350, and a conductive rivet 360. The conductive rivet 360 may be optional. The heating element 10 may be, for example, one of the heating elements shown in FIGS. 1A-3.

Figure 5G:
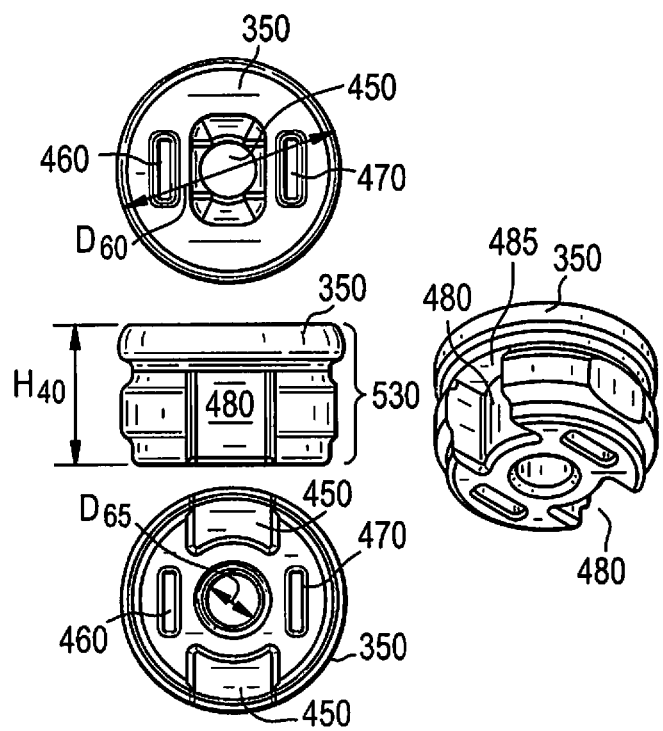

With reference to FIGS. 5A, 5B, and 5G, the support 350 may support the heating element 10 and be disposed in the housing 300. The support 350 may include silicon or some other material capable of withstanding varying temperatures of the heating element 10 such as organic elastomers and/or inorganic elastomers. The support 350 may have a substantially cylindrical shape and a diameter D60 between 7.7 mm and 8.5 mm, for example, 8.1 mm. It should be understood that the diameter D60 may vary from these values so long as the support 350 provides an effective seal in the reservoir 310. A central area of an end surface of the support 350 includes a through hole 450 with a diameter D65 between 1.7 mm and 2.1 mm, for example, 1.93 mm. It should be understood that the diameter D65 may vary from these values so long as the support 35 provides an effective seal between an outer wall of the inner tube 315 and the gasket 420. The support 350 may have a height H40 between 3.0 mm and 8.0 mm, for example, 5.1 mm. The through hole 450 may be aligned with the air channel 60, opening 410, and airway 600. If the conductive rivet 360 is not used, then the support 350 may include grooves along a lateral surface of the support 350 instead of the through hole 450. Here, the grooves allow for the airflow formerly provided by the through hole 450 and electrical connection to the powers supply 250 is provided via direct connection with the tip 41.

A first slot 460 and a second slot 470 may be on the end surface of the support 35 and disposed at opposing sides of the through hole 450. The first slot 460 and the second slot 470 may have a shape and size that accommodates the first lead portion 30 and the second lead portion 40 of the heating element 10. For example, as shown in FIG. 5B, the slots 460 and 470 have substantially rectangular shapes so that the first lead portion 30 extends through first slot 460, and the second lead portion 40 extends through the second slot 470. As also shown in FIG. 5B, the first lead portion 30 and the second lead portion 40 are bent in a direction that is substantially parallel to the planar portion 20 at tips 31 and 41. Although tip 31 is shown in FIG. 5B as not contacting a wall of the connector portion 320, the tip 31 may extend to contact the wall of the connector portion 320 if desired. For example, if the inner wall of connector portion 320 is electrically conductive, the tip 31 may be extended to electrically connect to the inner wall of the connector portion 320 so that the first lead portion 30 is electrically connected to the connector portion 320. As shown in FIG. 5B, the support 350 may include a thin membrane 351 in the first and second slots 460 and 470. The membrane 351 may be penetrated by the first and second lead portions 30 and 40 upon assembly and provide a seal at the penetration point. A thickness of the membrane 351 may be between 0.1 mm and 1.0 mm, for example, 0.3 mm.

Still referring to FIGS. 5A, 5B, and 5G, the lateral surface of the support 350 may have a male thread engagement portion 530 for thread engagement with a female thread engagement of the reservoir portion 310. Alternatively, the support 350 may push fit into the reservoir portion 310. As another alternative, the support 350 may affixed to the reservoir portion 310 with ultrasonic welding. In yet another alternative, the support 350 and the reservoir portion 310 may have a bayonet connection. It should be appreciated that other connections between the support 350 and the reservoir portion 310 are within the scope of example embodiments. The support 350 may include at least two recesses 480 on opposing sides of the lateral surface of the support 350. The recesses 480 may have a size, shape, and location that accommodate the tabs 510 and 520 of the connector portion 320. As shown in FIG. 5G, the recesses 480 have a substantially rectangular shape and extend from one end of the support 350 to a stop surface 485 to provide a tight fit with the tabs 510 and 520 (see FIG. 6 for connection between connector portion 320 and reservoir portion 310).

Figure 5H:
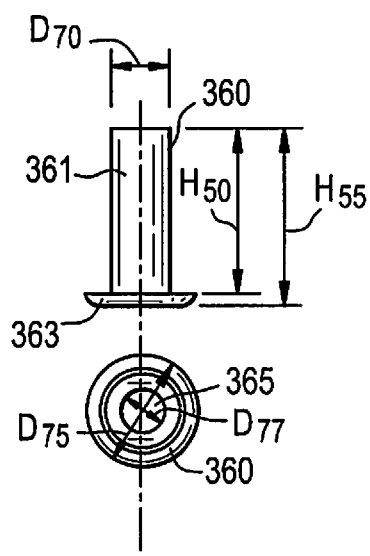

With reference to FIGS. 5A, 5B, and 5H, the support 350 includes a conductive rivet 360 extending through the through hole 450. The conductive rivet 360 may include metal or some other conductive material such as a brass coat with a nickel base and sliver plating. The conductive rivet 360 may include a substantially cylindrical body portion 361 and a substantially circular head portion 363 at one end of the body portion 363. The body portion 361 may have a diameter D70 between 1.77 mm and 2.17 mm, for example, 2.0 mm such that the conductive rivet 360 may push fit into the through hole 450 of the support 350. Alternatively, the conductive rivet 360 may be welded or soldered to a tip 41 of the second lead portion 40. The head portion 363 may have a diameter D75 larger than diameter D70. Diameter D75 may be between 2.5 mm and 4.5 mm, for example, 4.0 mm. The conductive rivet 360 may be substantially hollow. For example, an airway 365 may pass through a central area of conductive rivet 360. The airway 365 may have a diameter D77 between 1.2 mm and 1.7 mm, for example, 1.6 mm. A height H50 from a top surface of the head portion 363 to an opposing end of the conductive rivet 360 may be between 4.0 mm and 7.1 mm, for example, 6.5 mm. A height H55 from an end of the conductive rivet 360 to a bottom surface of the head portion 363 may be between 3.6 mm and 6.7 mm, for example, 6.1 mm.

An electrical connection of the heating element 10 to the battery 250 is described below with reference to FIGS. 4A, 4B, 5A, 5B, and 5H. As shown in FIG. 5B, the bottom surface of the head portion 363 is in electrical contact with a tip 41 of the second lead portion 40 while the top surface of the head portion 363 is in electrical contact with the conductive post 260 of the power supply section 230. However, the head portion 363 is spaced apart from a tip 31 of the first lead portion 30 so as to be electrically isolated from the tip 31. The tip 31 of the first lead portion 30 is electrically connected to connector 265 of the power supply section 230 upon engagement of the cartridge 220 and power supply section 230. For example, the connector 265 may be a conductive male thread of the power supply section 230 that makes electrical contact with the tip 31 upon engagement with a female thread of the connector portion 320. Alternatively, if an inner wall of connector portion 320 (e.g., the female thread) is electrically conductive, the tip 31 may be extended to electrically connect to the inner wall of the connector portion 320 so that the first lead portion 30 is electrically connected to the connector portion 320. In this case, the conductive male thread of the connector 265 may be in electrical contact with tip 31 through the inner wall of the connector portion 320.

As explained with reference to FIGS. 4A and 4B, when an adult vaper draws air through the mouthpiece 210, the puff sensor in control electronics 240 is operable to sense an air pressure drop in the e-vapor device 200 to cause the control electronics 240 to initiate the application of voltage from the battery 250 to the heating element 10 via the above described electrical contacts between the conductive post 260, the conductive rivet 360, and the tip 41 and between the tip 31 and the connector 265. It should be understood that the puff sensor acts as a switch that completes a closed loop circuit through the heating element 10 upon sensing the air pressure drop. The heating element 10 heats vapor drawn into the filament 50 from the porous substrate 400 to form vapor, which enters the adult vaper's mouth via air channel 60, opening 410 and airway 600.

Although not explicitly shown in FIGS. 5A-5H, it should be understood that the support 350 may have alternative structures that allow air to pass through. For example, in addition to or an alternative to the location of the airway 365, there may be other airways at the outer edge of the support 350 so that air is able to pass between the reservoir portion 310 and the support 350. It should be further understood that the conductive rivet 360 may be eliminated. In this case, the connector 265 may be in electrical contact with the tip 41 without the conductive rivet 360 in between.

Figure 6:
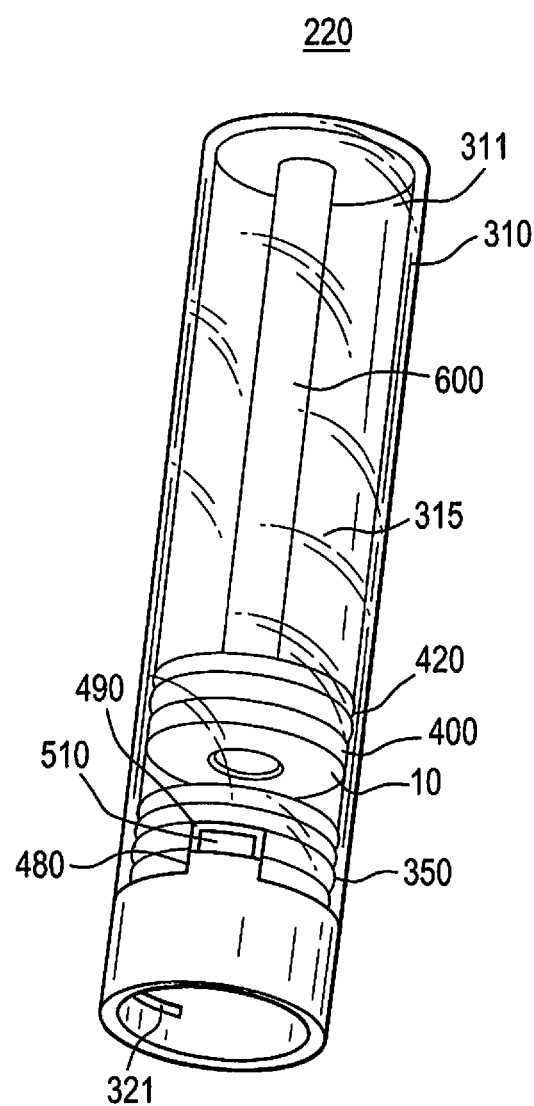
FIG. 6 is a three-dimensional rendering of the cartridge shown in FIGS. 5A and 5B.

FIG. 6 is a three-dimensional rendering of the cartridge shown in FIGS. 5A-5H.

FIG. 6 shows a completed cartridge 220 that is ready for connection to the mouthpiece 210 and/or connection to power supply section 230 in FIG. 4 via the female thread 321. As illustrated in FIG. 6, the heating element 10 may be spaced apart from the end surface of the support 350 with the aid of step portions 33 and/or 35 to provide efficient heat transfer to the porous substrate 400.

From the above provided description, it should be apparent that at least one example embodiment provides a unitary heating element, and heater assemblies cartridges, and e-vapor devices including a unitary heating element. The structure of a unitary heating element according to at least one example embodiment allows for efficient manufacturing/assembling of an e-vapor device. Further, a unitary heating element according to at least one example embodiment does not block air flow through an air channel thereof, which provides efficient and high volume vapor production.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

It is claimed:

1. A heating element for an e-vapor device, comprising:
a planar portion including a filament, the filament defining an air channel through a central portion of the planar portion, the filament being circular, the filament arranged so as to form a plurality of u-shaped portions encircling at least a majority of the air channel, tips of each of the plurality of u-shaped portions extending away from the air channel, a first one of the plurality of u-shaped portions being beside a last one of the plurality of u-shaped portions; and
first and second lead portions extending away from the planar portion, wherein the planar portion, the first lead portion, and the second lead portion are a unitary body, and the first lead portion is connected to the first one of the plurality of u-shaped portions and the second lead portion is connected to the last one of the plurality of u-shaped portions, such that the first lead portion is beside the second lead portion at a point of connection to the planar portion, the first and second lead portions at least partially surround the planar portion, the first lead portion includes a first tip, the second lead portion includes a second tip, and the first tip and the second tip being on opposite sides of the planar portion.

2. The heating element of claim 1, wherein the filament includes stainless steel.

3. The heating element of claim 1, wherein the first and second lead portions extend away from the planar portion in a direction that is perpendicular to the planar portion.

4. The heating element of claim 1, wherein the first tip of the first lead portion and the second tip of the second lead portion are bent in a direction that is parallel to the planar portion.

5. The heating element of claim 1, wherein the filament follows a circuitous path.

6. The heating element of claim 5, wherein a width of the filament varies along the circuitous path.

7. The heating element of claim 6, wherein the width of the filament gradually increases in a direction away from the air channel.

8. The heating element of claim 1, wherein the u-shaped portions are connected to one another at end sections of each u-shape.

9. The heating element of claim 1, wherein a space between adjacent ones of the plurality of u-shaped portions gradually increases in a direction away from the air channel.

10. A cartridge for an e-vapor device, comprising:
a housing including a reservoir portion and a connector portion, the connector portion being configured to connect the cartridge to a power supply section; and
a heater assembly including a heating element disposed in the housing, the heating element including,
a planar portion in fluid communication with the reservoir portion, the planar portion including a filament, the filament defining an air channel through a central portion of the planar portion, the filament being circular, the filament arranged so as to form a plurality of u-shaped portions encircling at least a majority of the air channel, tips of each of the plurality of u-shaped portions extending away from the air channel, a first one of the plurality of u-shaped portions being beside a last one of the plurality of u-shaped portions and
first and second lead portions extending away from the planar portion, wherein the planar portion, the first lead portion, and the second lead portion are a unitary body, and the first lead portion is connected to the first one of the plurality of u-shaped portions and the second lead portion is connected to the last one of the plurality of u-shaped portions, such that the first lead portion is beside the second lead portion at a point of connection to the planar portion, the first and second lead portions at least partially surround the planar portion, the first lead portion includes a first tip, the second lead portion includes a second tip, and the first tip and the second tip being on opposite sides of the planar portion.

11. The cartridge of claim 10, wherein the reservoir portion includes a porous substrate, and an inner tube defining an airway through a central area of the reservoir portion and defining a cavity between the housing and the inner tube, the cavity being configured to store a pre-vapor formulation, the porous substrate being in fluid communication with the cavity.

12. The cartridge of claim 11, wherein the porous substrate includes an opening aligned with the air channel, and the porous substrate contacts the planar portion of the heating element.

13. The cartridge of claim 11, wherein the reservoir portion includes a gasket configured to provide the fluid communication between the porous substrate and the reservoir portion.

14. The cartridge of claim 13, wherein the gasket includes an opening that fits around the inner tube, and the gasket is configured to provide the fluid communication via at least one aperture in the gasket.

15. The cartridge of claim 14, wherein the at least one aperture is four apertures in a diamond configuration around the opening.

16. The cartridge of claim 10, wherein the heater assembly includes a support disposed in the housing and supporting the heating element.

17. The cartridge of claim 16, wherein the support has an end surface including a through hole extending through a central area of the support, a first slot, and a second slot, the first slot and the second slot being disposed on the end surface at opposing sides of the through hole, the first lead portion extending through first slot, the second lead portion extending through the second slot.

18. The cartridge of claim 17, wherein the first lead portion and the second lead portion are bent in a direction that is substantially parallel to the planar portion.

19. The cartridge of claim 18, wherein the support includes a hollow conductive rivet extending through the through hole such that the conductive rivet is electrically connected to the second lead portion and electrically isolated from the first lead portion.

20. The cartridge of claim 16, wherein the support has a male thread to engage with a female thread of the housing.

21. The cartridge of claim 20, wherein the support includes at least two recesses disposed on opposite sides of a lateral surface of the support, the reservoir portion includes at least two connection points, and the connector portion includes at least two flexible tabs extending into the at least two recesses and releasably engaged with the at least two connection points.

22. The cartridge of claim 10, wherein the connector portion includes a conductive inner wall, and the first lead portion is electrically connected to the inner wall of the connector portion.

23. A heater assembly for an e-vapor device, comprising:
a heating element including,
a planar portion including filament, the filament defining an air channel through a central portion of the planar portion, the filament being circular, the filament arranged so as to form a plurality of u-shaped portions encircling at least a majority of the air channel, tips of each of the plurality of u-shaped portions extending away from the air channel, a first one of the plurality of u-shaped portions being beside a last one of the plurality of u-shaped portions, and
first and second lead portions extending away from the planar portion, wherein the planar portion, the first lead portion, and the second lead portion are a unitary body, and the first lead portion is connected to the first one of the plurality of u-shaped portions and the second lead portion is connected to the last one of the plurality of u-shaped portions, such that the first lead portion is beside the second lead portion at a point of connection to the planar portion, and the first and second lead portions at least partially surround the planar portion, the first lead portion includes a first tip, the second lead portion includes a second tip, and the first tip and the second tip being on opposite sides of the planar portion; and a support supporting the heating element, the support including a first slot and a second slot, the first lead portion extending through the first slot, the second lead portion extending through the second slot.

24. The heater assembly of claim 23, wherein the support is substantially cylindrical and has an end surface including a through hole a first slot, and a second slot, the through hole extending through a central area of the support, the first slot and the second slot being disposed on the end surface at opposing sides of the through hole, the first lead portion extending through first slot, the second lead portion extending through the second slot.

25. The heater assembly of claim 24, wherein the support has a male thread around circumference lateral surface of the support and at least two rectangular shaped recesses disposed in the male thread on opposing sides of the lateral surface of the support, the at least two recesses accommodating at least two tabs of a connection portion of the e-vapor device.

26. The heater assembly of claim 24, wherein the first lead portion and the second lead portion are bent in a direction that is substantially parallel to the planar portion.

27. The heater assembly of claim 26, wherein the support includes a hollow conductive rivet extending through the through hole such that the conductive rivet is electrically connected to the second lead portion and electrically isolated from the first lead portion.

28. The heater assembly of claim 24, wherein the through hole is aligned with the air channel.

29. An e-vapor device, comprising:
a cartridge including,
 a housing including a reservoir portion, and
 a heater assembly disposed in the housing, the heater assembly including a heating element, the heating element including,
  a planar portion in fluid communication with the reservoir portion, the planar portion including a filament, the filament defining an air channel through a central portion of the planar portion, the filament being circular, the filament arranged so as to form a plurality of u-shaped portions encircling at least a majority of the air channel, tips of each of the plurality of u-shaped portions extending away from the air channel, a first one of the plurality of u-shaped portions being beside a last one of the plurality of u-shaped portions, and
  first and second lead portions extending away from the planar portion, wherein the planar portion, the first lead portion, and the second lead portion are a unitary body, and the first lead portion is connected to the first one of the plurality of u-shaped portions and the second lead portion is connected to the last one of the plurality of u-shaped portions, such that the first lead portion is beside the second lead portion at a point of connection to the planar portion, the first and second lead portions at least partially surround the planar portion, the first lead portion includes a first tip, the second lead portion includes a second tip, and the first tip and the second tip being on opposite sides of the planar portion; and
a power supply section configured to selectively supply power to the heating element.

30. The e-vapor device of claim 29, wherein the cartridge and the power supply section are releasably connected.

31. The e-vapor device of claim 29, wherein the cartridge and the power supply section are in a unitary housing.

* * * * *